United States Patent
Hirasawa et al.

(10) Patent No.: US 10,536,613 B2
(45) Date of Patent: Jan. 14, 2020

(54) PRINTING SYSTEM, COLOR PROFILE MANAGEMENT METHOD, AND MANAGEMENT APPARATUS

(71) Applicant: SEIKO EPSON CORPORATION, Tokyo (JP)

(72) Inventors: Masahiko Hirasawa, Yamagata (JP); Hiroshi Iezaki, Matsumoto (JP); Nobuyuki Saito, Sapporo (JP); Yoshiki Katsuma, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/987,594

(22) Filed: May 23, 2018

(65) Prior Publication Data

US 2018/0343365 A1 Nov. 29, 2018

(30) Foreign Application Priority Data

May 24, 2017 (JP) .................. 2017-102407
Aug. 10, 2017 (JP) .................. 2017-155114

(51) Int. Cl.
*H04N 1/60* (2006.01)
*G06F 3/12* (2006.01)

(52) U.S. Cl.
CPC ......... *H04N 1/6097* (2013.01); *G06F 3/1208* (2013.01); *G06F 3/1231* (2013.01); *G06F 3/1255* (2013.01)

(58) Field of Classification Search
CPC .................................................. H04N 1/6097
See application file for complete search history.

(56) References Cited

U.S. PATENT DOCUMENTS

| | | | | |
|---|---|---|---|---|
| 6,947,174 B1 * | 9/2005 | Chen | ...................... | H04N 1/603 358/1.9 |
| 2003/0072030 A1 * | 4/2003 | Haines | .................. | G06F 3/1205 358/1.15 |
| 2003/0117639 A1 * | 6/2003 | Milton | .................. | G06K 15/02 358/1.13 |
| 2005/0141008 A1 * | 6/2005 | Billow | .................. | H04N 1/603 358/1.13 |
| 2007/0008594 A1 * | 1/2007 | MacDonald | ............. | H04N 1/46 358/504 |
| 2008/0043266 A1 * | 2/2008 | Misumi | ................ | H04N 1/6016 358/1.9 |
| 2010/0097649 A1 * | 4/2010 | Akiyama | .............. | G06F 3/1205 358/1.15 |
| 2010/0157357 A1 * | 6/2010 | Torikoshi | .............. | G06F 3/1203 358/1.15 |
| 2012/0105879 A1 * | 5/2012 | Tanaka | ................. | H04N 1/6033 358/1.9 |
| 2012/0314237 A1 * | 12/2012 | Araki | ................. | G06K 15/1857 358/1.13 |
| 2013/0003088 A1 * | 1/2013 | Feng | .................... | G06F 3/1204 358/1.9 |

(Continued)

FOREIGN PATENT DOCUMENTS

EP 2717557 A1 * 4/2014 ............. H04N 1/603
JP 2010-102398 A 5/2010

*Primary Examiner* — Ted W Barnes
(74) *Attorney, Agent, or Firm* — Workman Nydegger (57) ABSTRACT

A printing system that enables an image processing apparatus to, in the configuration in which one printing apparatus is managed by a plurality of management apparatuses, obtain a suitable color profile from one of the management apparatuses.

14 Claims, 9 Drawing Sheets

(56) References Cited

U.S. PATENT DOCUMENTS

| | | | | |
|---|---|---|---|---|
| 2013/0201508 A1* | 8/2013 | Zhang | ............... | H04N 1/0083 |
| | | | | 358/1.13 |
| 2013/0293904 A1* | 11/2013 | Shimizu | ............... | G06F 3/1205 |
| | | | | 358/1.9 |
| 2015/0201111 A1* | 7/2015 | Takasaki | ............... | H04N 1/603 |
| | | | | 358/1.9 |
| 2015/0273903 A1* | 10/2015 | Saito | ............... | B41J 3/46 |
| | | | | 347/16 |
| 2016/0080609 A1* | 3/2016 | Inada | ............... | H04N 1/6033 |
| | | | | 358/1.9 |
| 2017/0182821 A1* | 6/2017 | Tamiya | ............... | B41J 29/38 |
| 2017/0280022 A1* | 9/2017 | Kuroiwa | ............... | G06K 15/027 |

* cited by examiner

| IDENTIFICATION NUMBER ID | MEDIUM TYPE Mk | SETTING INFORMATION Im | |
|---|---|---|---|
| ID1 | Ik1 | Im1 | } R1, R |
| ID2 | Ik2 | Im2 | } R2, R |
| ID3 | Ik3 | Im3 | } R3, R |
| ID4 | Ik4 | Im4 | } R4, R |
| ID5 | Ik5 | Im5 | } R5, R |
| ID6 | Ik6 | Im6 | } R6, R |
| ID7 | Ik7 | Im7 | } R7, R |
| ID8 | Ik8 | Im8 | } R8, R |

| MEDIUM TYPE Mk | SETTING INFORMATION Im | PROFILE P |
|---|---|---|
| Ik1 | Im1 | P1 |
| Ik2 | Im2 | P2 |
| Ik3 | Im3 | P3 |
| Ik4 | Im4 | P4 |
| Ik5 | Im5 | P5 |
| Ik6 | Im6 | P6 |
| Ik7 | Im7 | P7 |
| Ik8 | Im8 | P8 |

PRINTING SYSTEM, COLOR PROFILE MANAGEMENT METHOD, AND MANAGEMENT APPARATUS

The entire disclosure of Japanese Patent Application No. 2017-102407, filed May 24, 2017 and 2017-155114, filed Aug. 10, 2017 are expressly incorporated by reference herein.

BACKGROUND

1. Technical Field

The present invention relates to a technique for managing color profiles for use in color management processing.

2. Related Art

In JP-A-2010-102398, there is disclosed a system in which a printing apparatus performs printing of an image on a printing medium on the basis of a set of printing data having been generated by a printing control apparatus. This printing control apparatus generates the set of printing data by executing color matching using one of international color consortium (ICC) profiles. This configuration enables the printing apparatus to perform printing of an image having a suitable color tone.

Such color profiles (the ICC profiles) differ for each of the types of printing media. In addition, in recent years when various types of printing media have been supplied from individual vendors, there is a possibility that an ICC profile that is to be used is not possessed by an image processing apparatus (the printing control apparatus) for generating a set of printing data. In such a case, a configuration in which a management apparatus for managing the printing apparatus is provided, and the management apparatus obtains a color profile associated with a printing medium that is to be used, by means of downloading or the like, and transfers the color profile to the image processing apparatus can be considered.

For such a configuration, however, under an environment in which one printing apparatus is shared by a plurality of users, a situation where a plurality of management apparatuses are provided to the respective plurality of users is assumed. In this case, there may occur a situation where each of the plurality of management apparatuses obtains a color profile associated with one of mutually different types of printing media, and allows the printing apparatus to perform printing. As a result, in a case where printing on the same type of printing medium is performed again, or any other similar case, such the situation has been likely to lead to a situation where the image processing apparatus cannot grasp which one of the management apparatuses possesses the color profile associated with the printing medium that is to be used, and thus cannot obtain a color profile suitable for the printing medium.

SUMMARY

An advantage of some aspects of the invention is that a technique is provided that enables an image processing apparatus to, in the configuration in which one printing apparatus is managed by a plurality of management apparatuses, obtain a suitable color profile from one of the management apparatuses.

A printing system according to a first aspect of the invention includes an image processing apparatus configured to execute color management processing on each of printing jobs using a color profile that is one of a plurality of color profiles each associated with a corresponding one of a plurality of mutually different types of printing media and that is associated with a printing medium included in the plurality of mutually different types of printing media and used as an execution target of the each printing job; a printing apparatus configured to perform printing of an image represented by the each printing job on the printing medium by executing the each printing job on which the color management processing has been executed; and a plurality of management apparatuses including at least one first management apparatus, and a second management apparatus configured to store in itself the plurality of color profiles, each of which is associated with a corresponding one of the plurality of mutually different types of printing media. Further, when the image processing apparatus makes a request, to a first management apparatus among the at least one first management apparatus, for the color profile, which is associated with the printing medium used as the execution target of the each printing job, the first management apparatus, having received the request, transfers the request to the second management apparatus, and then, the second management apparatus transmits the color profile, which is specified based on the request, to the image processing apparatus.

A color profile management method according to a second aspect of the invention includes making a request, by an image processing apparatus, to a first management apparatus among at least one first management apparatus, for a color profile that is one of a plurality of color profiles each associated with a corresponding one of a plurality of mutually different types of printing media and that is associated with a printing medium included in the plurality of mutually different types of printing media and used as an execution target of each of printing jobs; transferring, by the first management apparatus, the request to a second management apparatus storing in itself the plurality of color profiles, each of which is associated with a corresponding one of the plurality of mutually different types of printing media; and transmitting, by the second management apparatus, the color profile, which is specified based on the request, to the image processing apparatus.

A management apparatus according to a third aspect of the invention includes a control section configured to manage a printing apparatus for executing each of printing jobs, on which an image processing apparatus has executed color management processing using a color profile that is one of a plurality of color profiles each associated with a corresponding one of a plurality of mutually different types of printing media and that is associated with a printing medium included in the plurality of mutually different types of printing media and used as an execution target of the each printing job; a storage section configured to store in itself the plurality of color profiles, each of which is associated with a corresponding one of the plurality of mutually different types of printing media; and a communication section configured to perform communication with each of an external apparatus for managing the printing apparatus and the image processing apparatus. Further, when a request for the color profile, which is associated with the printing medium used as the execution target of the each printing job, is transferred to the control section, via the communication section, from the external apparatus having received the request from the image processing apparatus, the control section transmits the color profile, which is specified based on the request, to the image processing apparatus via the communication section.

According to the first, second, and third aspects of the invention (namely, the printing system, the color profile management method, and the management apparatus), having been configured in such ways as described above, the second management apparatus stores in itself the plurality of color profiles each associated with a corresponding one of the plurality of mutually different types of printing media, and upon receipt of the request, which specifies the color profile that is one of the plurality of color profiles and that is associated with the printing medium included in the plurality of mutually different types of printing media and used as the execution target of the each printing job, the first management apparatus transfers the request to the second management apparatus. Further, the second management apparatus transmits the color profile, which is specified based on the request, to the image processing apparatus. Thus, this configuration enables the image processing apparatus to, in the configuration in which the single printing apparatus is managed by the plurality of management apparatuses, obtain the color profile, which is suitable for the printing medium used as the execution target of the each printing job, from the first management apparatus.

Further, the printing system may be configured such that the printing apparatus stores in itself a piece of management information indicating which one of the plurality of management apparatuses is the second management apparatus, and, when the image processing apparatus makes the request to the first management apparatus, the first management apparatus, having received the request, specifies the second management apparatus based on the piece of management information, and transfers the request to the specified second management apparatus. This configuration enables the first management apparatus to properly specify the second management apparatus on the basis of the piece of management information stored in the printing apparatus.

Further, the printing system may be configured such that, upon receipt of the request, the first management apparatus stores in itself an address of the second management apparatus having been specified based on the piece of management information stored in the printing apparatus, and upon receipt of the request afterward, the first management apparatus transfers the request to the second management apparatus based on the stored address. This configuration enables the first management apparatus to, after the obtaining of the address of the second management apparatus, transfer the request to the second management apparatus without making the inquiry about the second management apparatus to the printing apparatus.

Further, the printing system may be configured such that each of the at least one first management apparatus, including the first management apparatus, is capable of obtaining one or more color profiles among the plurality of color profiles. This configuration enables a user of the each of the at least one first management apparatus to obtain, when needed, one or more color profiles included in the plurality of color profiles and having been determined to be necessary by the user.

In this case, the printing system may be configured such that, in a case where the first management apparatus already obtains the color profile specified by the request, the first management apparatus transmits the color profile to the image processing apparatus, and in a case where the first management apparatus does not obtain the color profile specified by the request, the first management apparatus transfers the request to the second management apparatus. This configuration enables the image processing apparatus to obtain the color profile, which is suitable for the printing medium used as the execution target of the each printing profile, from one of the at least one first management apparatus.

Further, the printing system may be configured such that the each of the at least one first management apparatus transmits the obtained one or more color profiles to the second management apparatus. This configuration enables the second management apparatus to collectively store in itself the one or more color profiles obtained by the each of the at least one first management apparatus.

Here, various kinds of configurations for allowing each of the at least one first management apparatus to obtain the one or more color profiles can be configured. That is, the printing system may be configured such that the second management apparatus allows the plurality of color profiles, which is stored in the second management apparatus itself, to be synchronized with the each of the at least one first management apparatus to allow the each of the at least one first management apparatus to obtain the plurality of color profiles. Alternatively, the printing system may be configured such that, when, in response to the request, the second management apparatus transmits the color profile to the image processing apparatus, the second management apparatus transmits the color profile to the first management apparatus to allow the first management apparatus to obtain the color profile.

Here, various kinds of configurations for the transmission of the color profile from the second management apparatus to the image processing apparatus can be configured. That is, the printing system may be configured such that the second management apparatus transmits the color profile, which is specified based on the request, to the image processing apparatus via the first management apparatus. Alternatively, the printing system may be configured such that the second management apparatus transmits the color profile, which is specified based on the request, to the image processing apparatus directly, that is, not via the first management apparatus.

Further, the printing system may be configured such that the second management apparatus stores in itself a plurality of sets of setting information one of which is set to the printing apparatus when the each printing job is executed, in such a way that, for each of the plurality of mutually different types of printing media, a corresponding one of the plurality of sets of setting information is associated with a corresponding one of the plurality of color profiles. This configuration enables the second management apparatus to collectively the plurality of sets of setting information together with the plurality of color profiles.

In this case, the printing system may be configured such that the second management apparatus transmits, to the printing apparatus, a set of setting information that is one of the plurality of sets of setting information and that is associated with the printing medium, which is included in the plurality of mutually different types of printing media and used as the execution target of the each printing job. This configuration enables the printing system to execute the each printing job using a suitable set of setting information appropriate associated with the type of the printing medium, which is used as the execution target of the each printing job.

Further, the printing system may be configured such that, when the first management apparatus transfers the request to the second management apparatus, the first management apparatus requests the image processing apparatus to establish a connection to the second management apparatus. This configuration enables the color profile to be certainly transmitted from the second management apparatus to the image processing apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
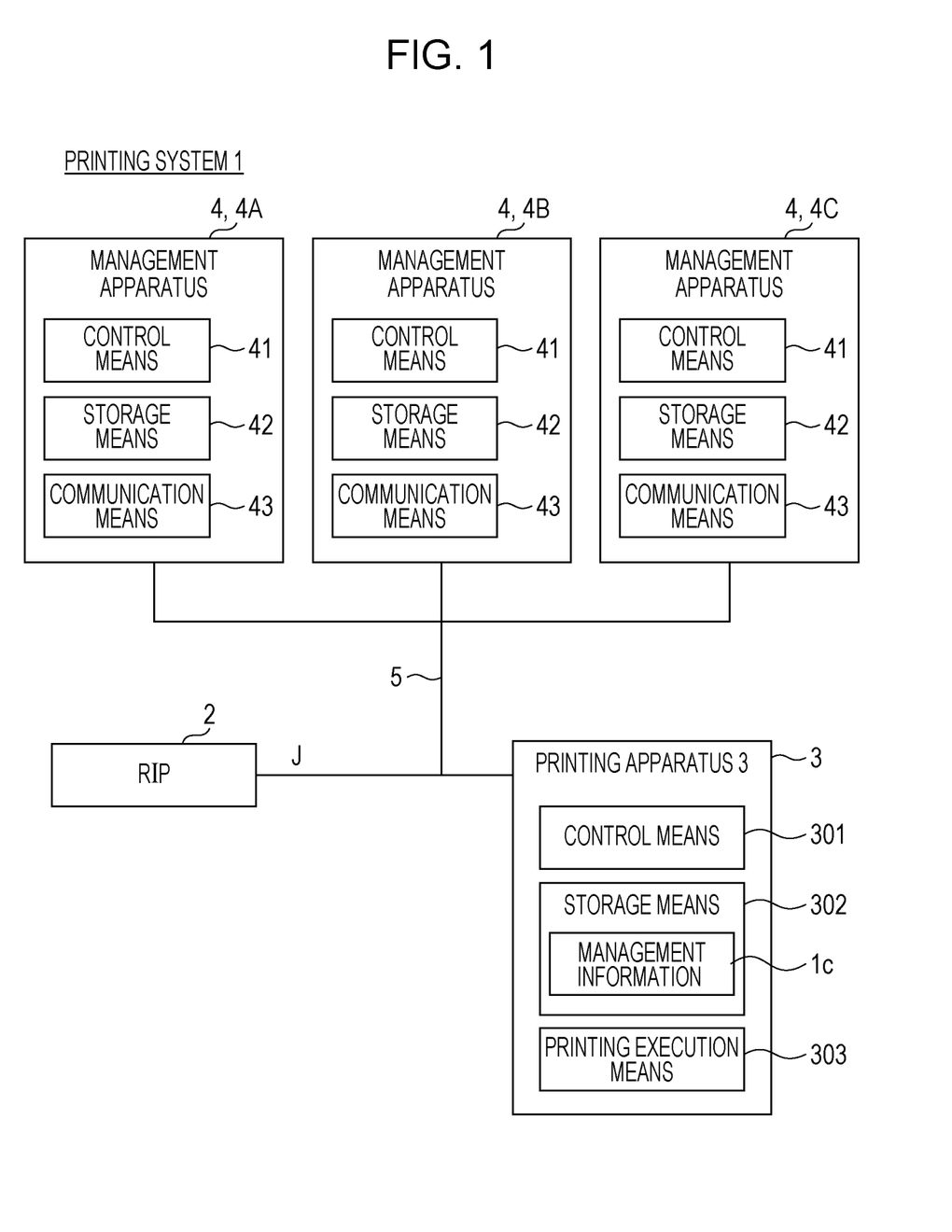
FIG. 1 is a block diagram illustrating an example of the configuration of a printing system according to embodiments of the invention.

FIG. 1 is a block diagram illustrating an example of the configuration of a printing system 1, as a printing system according to embodiments of the invention, which will be described later. The printing system 1 includes a raster image processor (RIP) 2 and a printing apparatus 3, and allows the printing apparatus 3 to execute printing processing for printing an image represented by a printing job J. This printing job J is a printing job on which image processing has been executed by the RIP 2. Further, the printing system 1 includes a plurality of (three) management apparatuses 4 and a network 5 (for example, a local area network). These management apparatuses 4 manage the printing apparatus 3. The network 5 allows the management apparatuses 4, the RIP 2, and the printing apparatus 3 to be connected to one another. Each of the management apparatuses 4 includes a control means 41, a storage means 42, and a communication means 43. The control means 41 is constituted by a central processing unit (CPU), a random access memory (RAM), and the like. The storage means 42 is constituted by a hard disc drive or the like. The communication means 43 is connected to the network 5. Note that, in the flowing description, the three management apparatuses 4 will be distinguished as management apparatuses 4A, 4B, and 4C when needed.

The RIP 2 is a computer in which software for executing image processing including color management processing and rasterization is installed. That is, the RIP 2 executes the color management processing using an ICC profile on the printing job J. Moreover, the RIP 2 performs the rasterization of the printing job J having been subjected to the color management processing. The printing job J (a set of raster data) having been rasterized in this way is transmitted to the printing apparatus 3 from the RIP 2.

The printing apparatus 3 includes a control means 301, a storage means 302, and a printing execution means 303. The control means 301 is constituted by a CPU, a RAM, and the like. The storage means 302 is constituted by a hard disc drive or the like. The printing execution means 303 corresponds to mechanical components for performing printing of an image on a printing medium. The printing apparatus 3 performs printing of an image represented by the printing job J on the printing medium in such a way that the control means 301 allows the printing execution means 303 to execute the printing job J having been received from the RIP 2.

Figure 2:
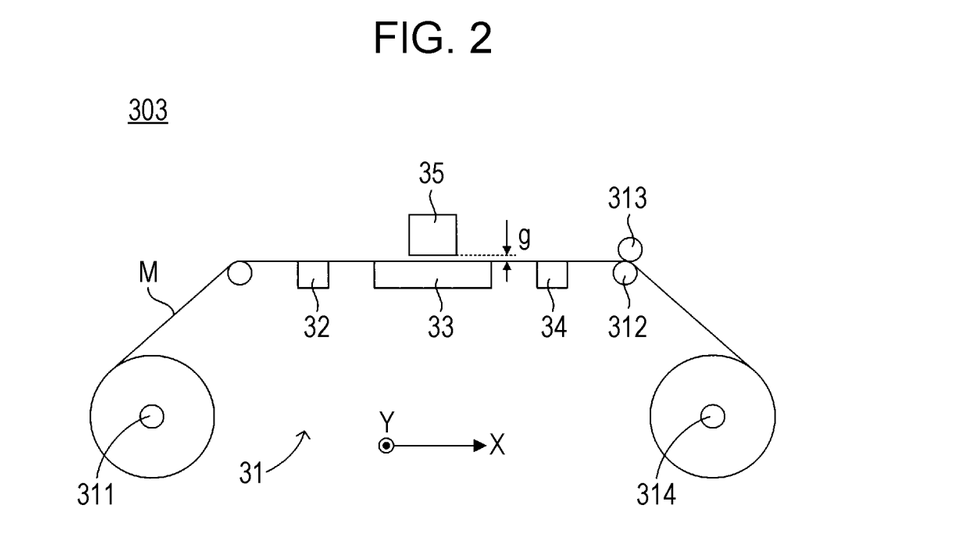
FIG. 2 is a diagram schematically illustrating an example of the structure of a printing execution means included in a printing apparatus of the printing system.

FIG. 2 is a diagram schematically illustrating an example of the structure of the printing execution means 303, which is included in the printing apparatus 3. The printing execution means 303 includes a transport portion 31, and this transport portion 31 transports a printing medium M in a transport direction X by means of a roll-to-roll method. The transport portion 31 includes a feed-out roller 311, a pair of rollers 312 and 313, and a winding roller 314, and these components are arranged in series in the transport direction X of the printing medium M. The printing medium M is in a state of being wounded in a roll shape, and the feed-out roller 311 feeds out such the printing medium M in the transport direction X. The pair of rollers 312 and 313 pinches the printing medium M having been fed out by the feed-out roller 311. The roller 313 is energized by the roller 312, and gives a constant weight to the printing medium M; while the roller 312 transports the printing medium M in the transport direction X while giving a constant tension to the printing medium M by giving a predetermined torque to the printing medium M. Further, the winding roller 314 winds up the printing medium M from the pair of rollers 312 and 313.

Further, the printing execution means 303 include a pre-heater 32, a platen heater 33, and an after-heater 34 between the feed-out roller 311 and the roller 312, these heaters being arranged in series in the transport direction X. Further, the printing execution means 303 heats the printing medium M being in contact with the upper faces of the above three kinds of heaters. Moreover, the printing execution means 303 includes a printing head 35. The printing head 35 faces the platen heater 33 across a predetermined platen gap g, and ejects inks onto the printing medium M supported by the platen heater 33 by means of an ink jet method.

In such the printing execution means 303, the transport portion 31 intermittently transports the printing medium M in the transport direction X, and thereby, sequentially feeds out an unprinted region of the printing medium M onto the platen heater 33. Further, the printing head 35 executes main-scanning for ejecting the inks while moving in a scanning direction Y. This scanning direction Y is orthogonal to the transport direction X. In this case, the number of the executions of the main-scanning by the printing head 35 (namely, a pass execution number) can be optionally set. The printing head 35 executes the main-scanning a plurality of times equal to the pass execution number having been set, and thereby performs printing of an image on the printing medium M being halted on the platen heater 33. Further, an execution interval between every two successive ones of the plurality of executions of the main-scanning is adjusted to control a drying duration during which inks having been landed on the printing medium M by an immediately previous execution of the main-scanning are dried by the platen heater 33.

Let us return to FIG. 1 and continue the description. As described above, the printing system 1 allows the management apparatuses 4 to control the RIP 2 and the printing apparatus 3. Particularly, each of the management apparatuses 4 controls the operation of the RIP 2 and that of the printing apparatus 3 in accordance with the medium type of the printing medium M. Here, non-limiting examples of physical configurations behaving as elements that prescribe the medium type of the printing medium M include the length of the printing medium M; the width of the printing medium M; the thickness of the printing medium M; the weight per unit area of the printing medium M; the material of the printing medium M (paper, film, a material resulting from laminating these materials, or the like); the water absorption property of the printing medium M; the color of the printing medium M; and the presence or absence of paste in the printing medium M. Namely, in the case where, for any two printing media M, there is a difference in at least any one of the above physical configurations, it can be handled that the medium types of the two printing media M are different from each other.

On the other hand, non-limiting examples of machine parameters for the printing performed by the printing apparatus 3 include the tension given to the printing medium M; the weight of the roller 313; the platen gap g; the number of the executions of the main-scanning (the pass execution number); the execution interval for the executions of the main-scanning; the temperature of the pre-heater 32; the temperature of the platen heater 33 and the temperature of the after-heater 34, and one or more of these machine parameters may differ for each of the medium types of the printing media M.

Thus, each of the management apparatuses 4 specifies, to the printing apparatus 3, machine parameters associated with the medium type of the printing medium M that is to be used in the printing processing, and then, the printing apparatus 3 executes the printing job J using the specified machine parameters. Specifically, the printing apparatus 3 stores a table Ta in the storage means 302, and this table Ta stores therein sets of setting information Im, each of these sets of setting information Im being associated with a corresponding one of medium types Mk for the printing medium M, and indicating corresponding values of the individual machine parameters. Further, the printing apparatus 3 executes the printing job J using a set of setting information Im having been specified from among the sets of setting information Im stored in the table Ta.

Figure 3:
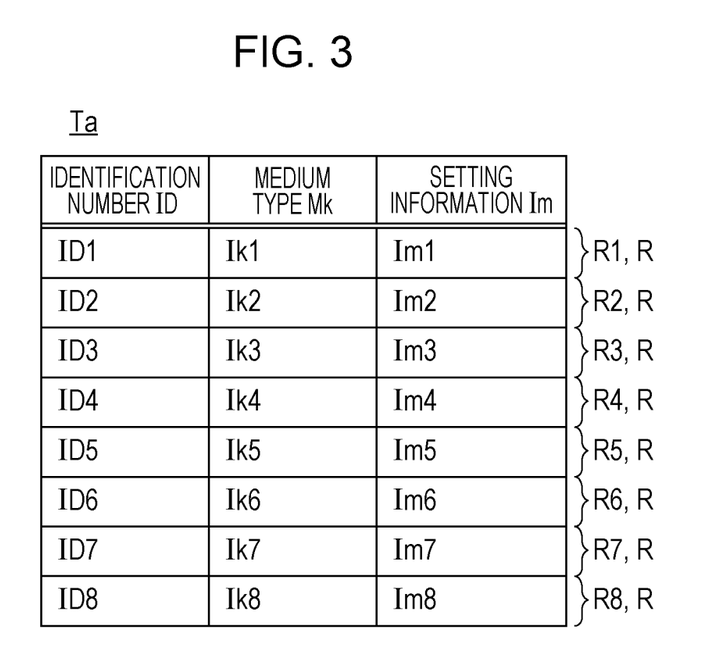
FIG. 3 is a diagram schematically illustrating an example of the configuration of a table stored in the printing apparatus.

FIG. 3 is a diagram schematically illustrating an example of the configuration of the table Ta, stored in the printing apparatus 3. The table Ta includes a plurality of storage regions R (R1 to R8) each associated with a corresponding one of the mutually different medium types Mk. Further, identification numbers ID (ID 1 to ID 8) are each added to a corresponding one of the storage regions R to identify the individual storage regions R. Further, in each of the storage regions R, a corresponding one of the sets of setting information Im (Im 1 to Im 8) and a corresponding one of the medium types Mk, that is to say specifically, a corresponding one of pieces of medium type information Ik (Ik 1 to Ik 8), are stored in such a way as to be associated with each other. Here, each of the pieces of medium type information Ik indicates a corresponding one of the medium types Mk. In this case, non-limiting examples of content stored in the table Ta as each of the pieces of medium type information Ik, namely, as each of the medium Types Mk, include the name of a corresponding printing medium M; an identification code for identifying the each medium type Mk, and the specific value of each of one or more of the physical configurations for the corresponding printing medium M. Further, as the each piece of medium type information Ik, additionally, a vendor that supplies the corresponding printing medium M may be stored. Namely, information indicating each of the medium types Mk of the printing media M can be stored as a corresponding one of the pieces of medium type information Ik.

Further, the content of the storage means 42 of each of the management apparatuses 4 is synchronized with that of the storage means 302 of the printing apparatus 3, and the content of the table Ta of the storage means 302 is periodically reflected into the storage means 42 of each of the management apparatuses 4. Further, each of the management apparatuses 4 instructs the printing apparatus 3 to use a set of setting information Im being among the sets of setting information Im of the table Ta and associated with a medium type Mk of a printing medium M used as a printing target in a printing job J that is to be executed. The printing apparatus 3 executes the printing job J using the instructed set of setting information Im.

Further, in the color management processing executed by the RIP 2, an ICC profile to be used differs in accordance with a medium type Mk of a printing medium M that is to be used. Thus, one of the management apparatuses 4 specifies, to the RIP 2, an ICC profile associated with a medium type Mk of a printing medium M that is to be used in printing processing, and then, the RIP 2 executes the color management processing on the printing job J using the specified ICC profile.

Specifically, the management apparatus 4A, as one management apparatus 4 among the plurality of management apparatuses 4, is selected in advance by a user as a second management apparatus. Here, the management apparatuses 4B and 4C other than the second management apparatus 4A among the plurality of management apparatuses 4 will be referred to as first management apparatuses when needed. For example, the user is able to select a management apparatus 4 having been initially introduced, or a management apparatus 4 having the highest arithmetic ability among the plurality of management apparatuses 4, as the second management apparatus. In addition to the selection of the second management apparatus, the user allows the storage means 302 of the printing apparatus 3 to store therein a piece of management information Ic, as a piece of management information indicating which one of the management apparatuses 4 is the second management apparatus 4A (specifically, the piece of management information Ic being the address or the like of the second management apparatus 4A). The second management apparatus 4A having been selected in this way stores a table Tb in the storage means 42, and in this table Tb, for each of the medium types Mk, a corresponding ICC profile and a corresponding set of setting information Im are stored in such a way as to be associated with each other. Further, in response to a request from the RIP 2, the second management apparatus 4A selects an ICC profile from among the ICC profiles stored in the table Tb, and sends back the selected ICC profile to the RIP 2.

Figure 4:
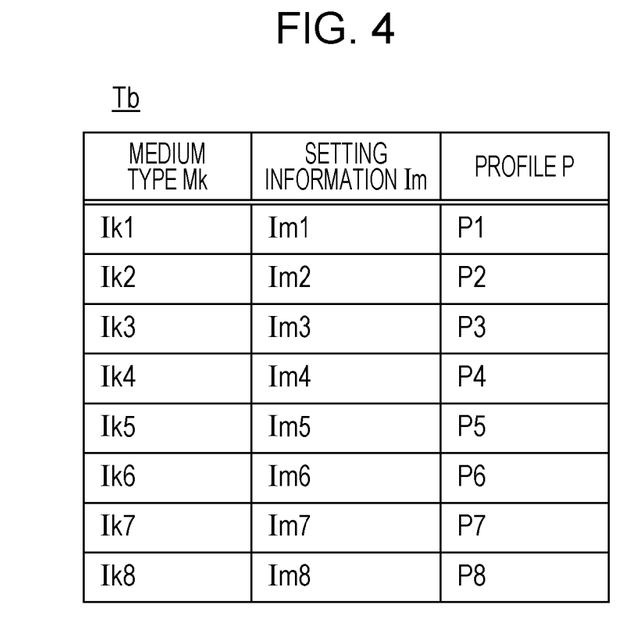
FIG. 4 is a diagram illustrating an example of the configuration of a table stored in a table stored in a second management apparatus of the printing system.

FIG. 4 is a diagram schematically illustrating an example of the configuration of the table Tb, stored in the second management apparatus 4A. The table Tb stores therein the plurality of sets of setting information Im each associated with a corresponding one of the mutually different medium types Mk. As described above, the sets of setting information Im are synchronized with those of the table Ta of the printing apparatus 3, and thereby, are stored into the table Tb. Moreover, the table Tb stores therein a plurality of ICC profiles P (P1 to P8) each associated with a corresponding one of the mutually different medium types Mk. In this way, in the table Tb, for each of the medium types Mk, a corresponding set of setting information Im and a corresponding ICC profile P are associated with each other. In addition, the ICC profiles P are obtained by means of downloading to the second management apparatus 4A from a profile server via, for example, the Internet communication network.

Further, the RIP 2 makes a request, to one of the management apparatuses 4, for an ICC profile P that is among the plurality of ICC profiles P stored in the table Tb and that is associated with a medium type Mk of a printing medium M that is to be used, and then, obtains the ICC profile P. Note that, in the present embodiment, the RIP 2 does not recognize which one of the management apparatuses 4 is the second management apparatus 4A, and thus, the RIP 2 transmits the request for the ICC profile P to a management apparatus 4 having been registered in a way using registration processing illustrated in next FIG. 5. Further, the management apparatus 4 having received the request from the RIP 2 specifies the second management apparatus 4A on the basis of the piece of management information Ic stored in the printing apparatus 3, and then, mediates between the RIP 2 and the second management apparatus 4A. In the following description, a series of these operations will be described in detail.

Figure 5:
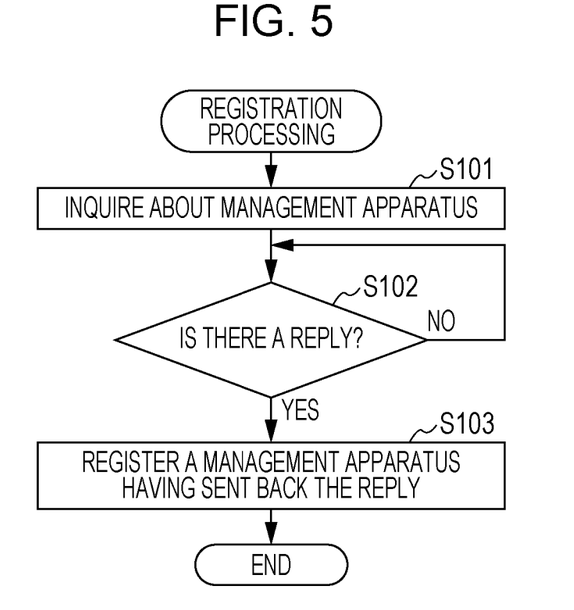
FIG. 5 is a flowchart illustrating an example of processing for registering a management apparatus into a raster image processor (RIP) of the printing system.

FIG. 5 is a flowchart illustrating an example of processing for registering one management apparatus 4 into the RIP 2. In step S101, the RIP 2 transmits, onto the network 5, an inquiry about the presence or absence of at least one management apparatus 4 by means of broadcasting. In step S102, the RIP 2 confirms whether or not there exists any reply to the inquiry having been made in step S101. Further, in the case where there exists a reply ("YES" in step S102), the RIP 2 registers a management apparatus 4 having sent back the reply, as the destination of the transmission of the request (step S103). In this way, among the plurality of management apparatuses 4, one management apparatus 4 having firstly sent back the reply to the RIP 2 is registered. According to such the flowchart, there may be a case where the second management apparatus 4A is registered, but, here, a case where the first management apparatus 4B is registered and the first management apparatus 4B does not possess a color profile requested by the RIP 2 will be described.

First Embodiment

Figure 6:
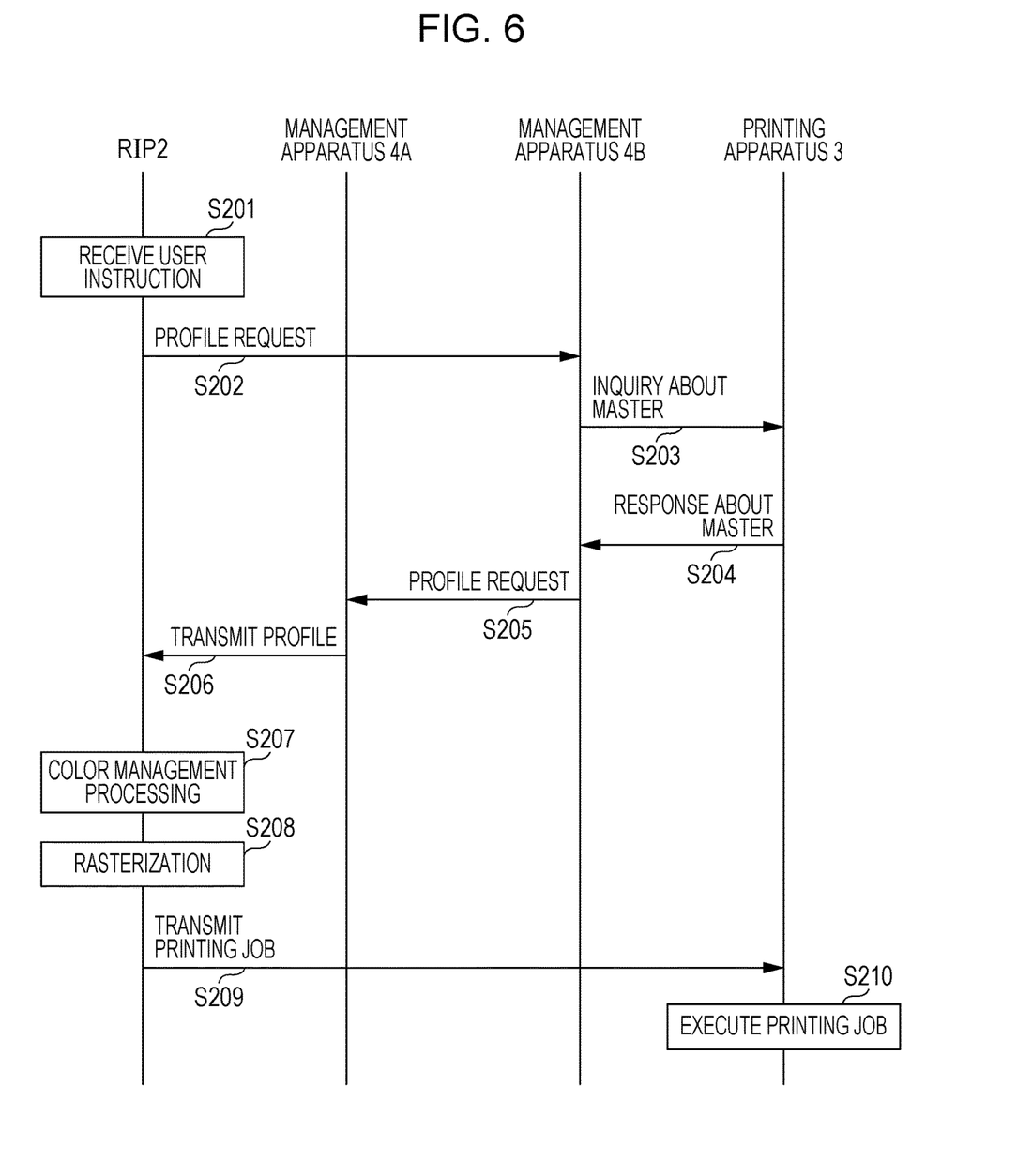
FIG. 6 is a flowchart illustrating the operation executed by the printing system in a first embodiment of the invention.

FIG. 6 is a flowchart illustrating an example of the operation executed by the printing system 1 in this first embodiment. In step S201, the RIP 2 receives a user instruction for instructing the execution of the image processing (the color management processing and the rasterization) on a printing job J. This user instruction is made in such a way as to include the specification of a medium type Mk of a printing medium M that is to be used as the printing target of the printing job J. In step S202, the RIP 2 transmits, to the first management apparatus 4B, a profile request for requesting an ICC profile P associated with the medium type Mk indicated by the user instruction. Upon receipt of the profile request from the RIP 2, the first management apparatus 4B makes an inquiry to the printing apparatus 3 about the second management apparatus 4A indicated by the piece of management information Ic (step S203), and the printing apparatus 3 sends back a response indicating the second management apparatus 4A indicated by the piece of management information Ic (step S204).

When the second management apparatus 4A has been specified in this way, the first management apparatus 4B transfers, to the second management apparatus 4A, the profile request from the RIP 2 (step S205). Upon receipt of the profile request, the second management apparatus 4A transmits, to the RIP 2, an ICC profile P corresponding to the profile request (step S206). The RIP 2 executes the color management processing on the printing job J using the ICC profile P having been received from the second management apparatus 4A (step S207), and further, executes the rasterization (step S208). The printing job J having been subjected to the image processing in this way is transmitted to the printing apparatus 3 from the RIP 2 (step S209). Further, an image is printed on the printing medium M through the execution of such the printing job J by the printing apparatus 3 (step S210).

In the first embodiment described above, among the plurality of management apparatuses 4 for managing the printing apparatus 3, one management apparatus 4 serves as the second management apparatus 4A, and the other management apparatuses 4 serve as the first management apparatuses 4B and 4C. The second management apparatus 4A collectively stores therein the plurality of ICC profiles P each associated with a corresponding one of the printing media M having the mutually different medium types Mk. On the other hand, upon receipt of a request from the RIP 2 for an ICC profile P associated with a medium type Mk of a printing medium M that is to be used as the execution target of a printing job J, the first management apparatus 4B transfers the request to the second management apparatus 4A. Further, the second management apparatus 4A transmits, to the RIP 2, the ICC profile P, which is specified on the basis of the request. In this way, in the configuration in which the single printing apparatus 3 is managed by the plurality of management apparatuses 4, the above procedures enable the RIP 2 to obtain a suitable ICC profile P from one of the management apparatuses 4.

Further, the printing apparatus 3 stores therein the piece of management information Ic, which indicates which one of the plurality of management apparatuses 4 is the second management apparatus 4A. Further, when the RIP 2 makes a request to the first management apparatus 4B, the first management apparatus 4B, having received the request, transfers the request to the second management apparatus 4A, having been specified by the first management apparatus 4B on the basis of the piece of management information Ic. Thus, the above configuration enables the first management apparatus 4B to properly specify the second management apparatus 4A on the basis of the piece of management information Ic, stored in the printing apparatus 3.

By the way, for the above plurality of management apparatuses 4, a management apparatus 4 capable of obtaining one or more ICC profiles P from a file server is not limited to the second management apparatus 4A. That is, the printing system 1 may be configured such that each of the first management apparatuses 4B and 4C is also capable of obtaining the one or more ICC profiles P. Subsequently, a second embodiment that is suitable for such a configuration will be described. Note that the following description will be made mainly on points different from the first embodiment, and points in common with the first embodiment will be denoted by equivalent reference signs to allow the description on such points in common to be appropriately omitted. In this regard, however, the second embodiment includes constituent elements in common with the first embodiment, and thus, it is needless to say that, in the second embodiment, the same advantageous effects as those of the first embodiment are brought about.

Second Embodiment

Figure 7:
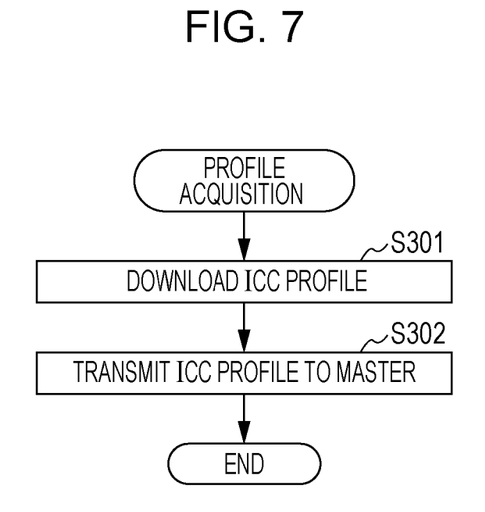
FIG. 7 is a flowchart illustrating the operation executed by a first management apparatus of the printing system in a second embodiment of the invention.

FIG. 7 is a flowchart illustrating an example of the operation executed by the first management apparatus 4B in this second embodiment. Note that, although the operation executed by the first management apparatus 4B is described here, the first management apparatus 4C also executes the same operation. In step S301, the first management apparatus 4B downloads one or more ICC profiles P from a profile server, and stores the one or more ICC profiles P into the storage means 42 in such a way that each of the one or more ICC profiles is associated with a corresponding one of medium types Mk of printing media M. Further, in step S302, the first management apparatus 4B transmits the downloaded one or more ICC profiles P to the second management apparatus 4A. Such the transmission of the one or more ICC profiles P is made in the same way as described above, that is, in the way that refers to the piece of management information Ic stored in the printing apparatus 3. The above procedures enable the second management apparatus 4A to collectively store the one or more ICC profiles P, having been obtained by the first management apparatus 4B, into the table Tb in such a way that each of the one or more ICC profiles P is associated with a corresponding one of the medium types Mk.

Figure 8:
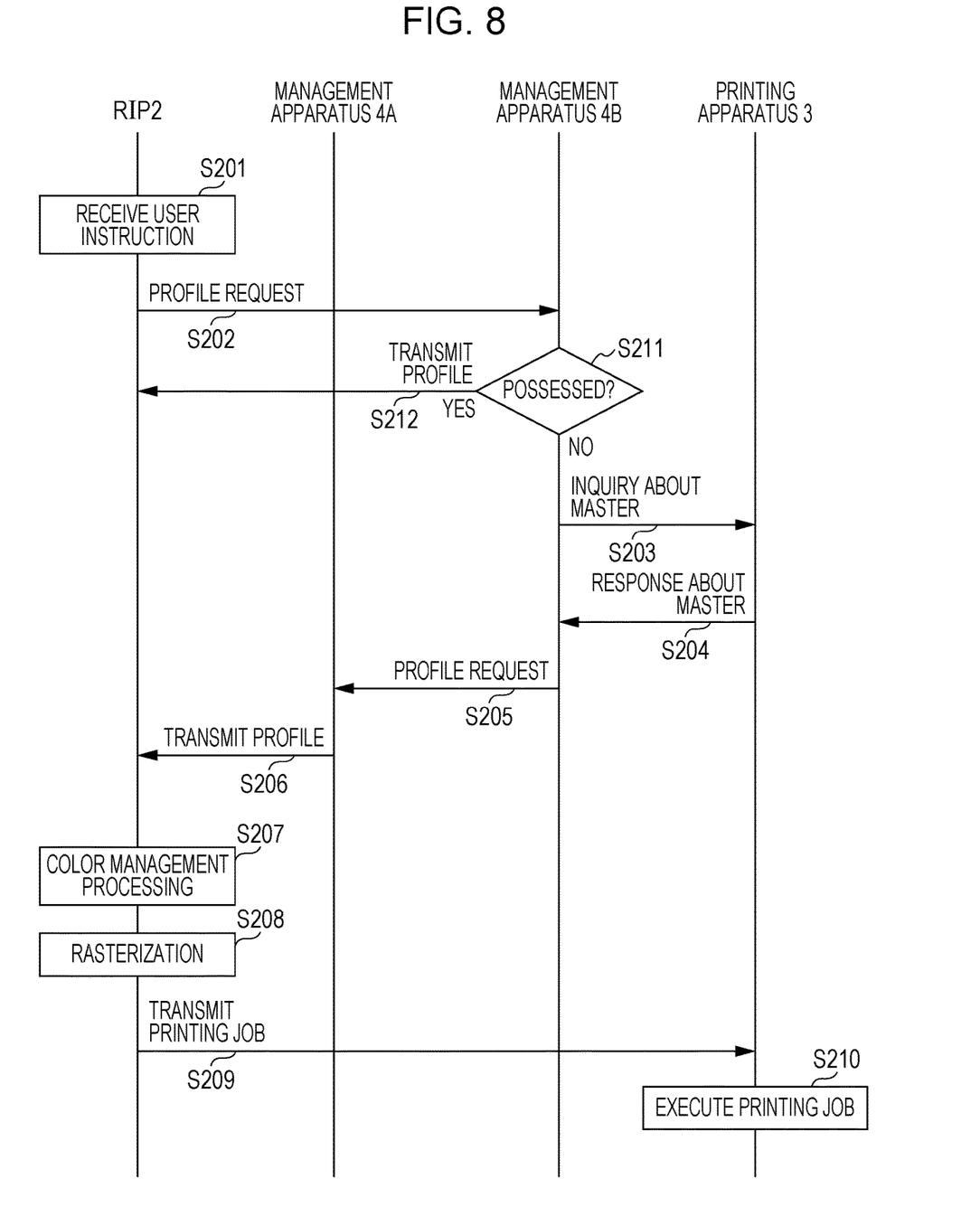
FIG. 8 is a flowchart illustrating the operation executed by the printing system in the second embodiment.

FIG. 8 is a flowchart illustrating an example of the operation executed by the printing system 1 in the second embodiment. In this flowchart, upon receipt of a profile request from the RIP 2, the first management apparatus 4B determines whether or not its own storage means 42 possesses an ICC profile P corresponding to the profile request (step S211). In the case where the storage means 42 possesses the ICC profile P (in the case of "YES" in step S211), the first management apparatus 4B transmits the ICC profile P to the RIP (step S212). Further, the RIP 2 executes the color management processing using the ICC profile P having been received from the first management apparatus 4B (step S207). In contrast, in the case where the storage means 42 does not possess the ICC profile P (in the case of "NO" in step S211), step S203 and subsequent steps are executed just like in the first embodiment.

In the second embodiment described above, the first management apparatus 4B is capable of obtaining one or more ICC profiles P. Thus, a user of the first management apparatus 4B is able to obtain, when needed, one or more ICC profiles P having been determined by the user to be necessary.

In this case, in the case where the first management apparatus 4B already obtains the requested ICC profile P, the first management apparatus 4B transmits the ICC profile P to the RIP 2; while, in the case where the first management apparatus 4B does not obtain the requested ICC profile P, the first management apparatus 4B transfers the request to the second management apparatus 4A. This procedure enables the RIP 2 to obtain a suitable ICC profile P from one of the management apparatuses 4.

Further, the first management apparatus 4B transmits the obtained one or more ICC profiles P to the second management apparatus 4A. This procedure enables the second management apparatus 4A to collectively store therein the one or more ICC profiles P having been obtained by the first management apparatus 4B.

Third Embodiment

In the above second embodiment, the first management apparatus 4B obtains the one or more ICC profiles P by means of downloading from a profile server. In this regard, in this third embodiment, the first management apparatus 4B obtains the plurality of ICC profile P by allowing the content of its own storage means 42 to be synchronization with the content of the storage means 42 of the second management apparatus 4A. Specifically, when one of predetermined triggers occurs, the content of the storage means 42 of the second management apparatus 4A and the content of the storage means 42 of the first management apparatus 4B are synchronized with each other. As a result, the content of the table Tb of the storage means 42 of the second management apparatus 4A is periodically reflected into the storage means 42 of the first management apparatus 4B. Non-limiting examples of timing points when the synchronization is triggered include a timing point when the first management apparatus 4B is powered on; a timing point when the first management apparatus 4B is connected to the network; a timing point when the second management apparatus 4A obtains one or more of the plurality of ICC profiles P; and a timing point when the plurality of ICC profiles P of the second management apparatus 4A is updated.

In such the third embodiment, in the case where the synchronization between the second management apparatus 4A and the first management apparatus 4B is already executed, and the first management apparatus 4B already possesses an ICC profile P corresponding to the profile request, the result of the determination in step S211 of FIG. 8 becomes "YES", and the ICC profile P is transmitted to the RIP 2 from the first management apparatus 4B (step S212). In contrast, in the case where the synchronization between the second management apparatus 4A and the first management apparatus 4B is not yet executed, and the first management apparatus 4B does not possess the ICC profile P corresponding to the profile request, the result of the determination in step S211 of FIG. 8 becomes "NO", and steps S203 to S206 are executed.

Fourth Embodiment

Figure 9:
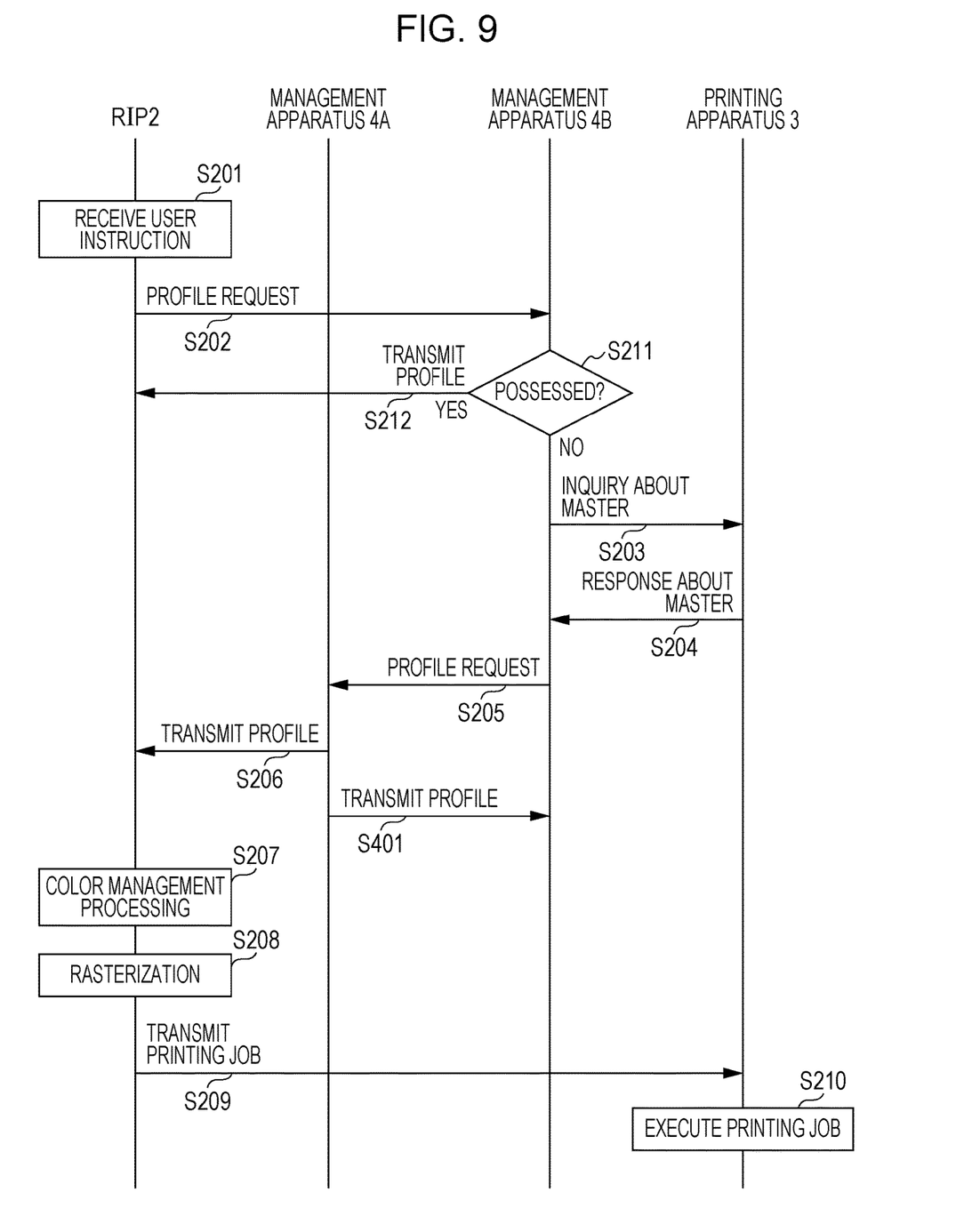
FIG. 9 is a flowchart illustrating the operation executed by the printing system in a fourth embodiment of the invention.

FIG. 9 is a flowchart illustrating an example of the operation executed by the printing system 1 in this fourth embodiment. In this fourth embodiment, another modification example of the configuration for allowing the first management apparatus 4B to obtain one or more ICC profiles P will be described. That is, in this modification example, upon receipt of a profile request in step S205, the second management apparatus 4A transmits an ICC profile P to the RIP (step S206), and simultaneously transmits the ICC profile P to the first management apparatus 4B (step S401). Further, the first management apparatus 4B stores and retains the received ICC profile P in the storage means 42.

Further, in each of operations after the execution of the above procedures, in the case where the first management apparatus 4B has received a request for an ICC profile P having already been received from the second management apparatus 4A, the result of the determination in step S211 becomes "YES", and the ICC profile P is transmitted to the RIP 2 from the first management apparatus 4B (step S212). In contrast, in the case where the first management apparatus 4B has not yet received the ICC profile P from the second management apparatus 4A, the result of the determination in step S211 becomes "NO", and steps S203 to S206 are executed.

In the third and fourth embodiments described above, the first management apparatus 4B is capable of obtaining the one or more ICC profiles P. Thus, a user of each of the first management apparatuses 4B and 4C is able to obtain, when needed, one or more ICC profiles P having been determined by the user to be necessary.

In this case, when the first management apparatus 4B already obtains the requested ICC profile P, the first management apparatus 4B transmits the ICC profile P to the RIP 2; while, when the first management apparatus 4B does not obtain the requested ICC profile P, the first management apparatus 4B transfers the request to the second management apparatus 4A. This procedure enables the RIP 2 to obtain a suitable ICC profile P from one of the management apparatuses 4.

Fifth Embodiment

Figure 10:
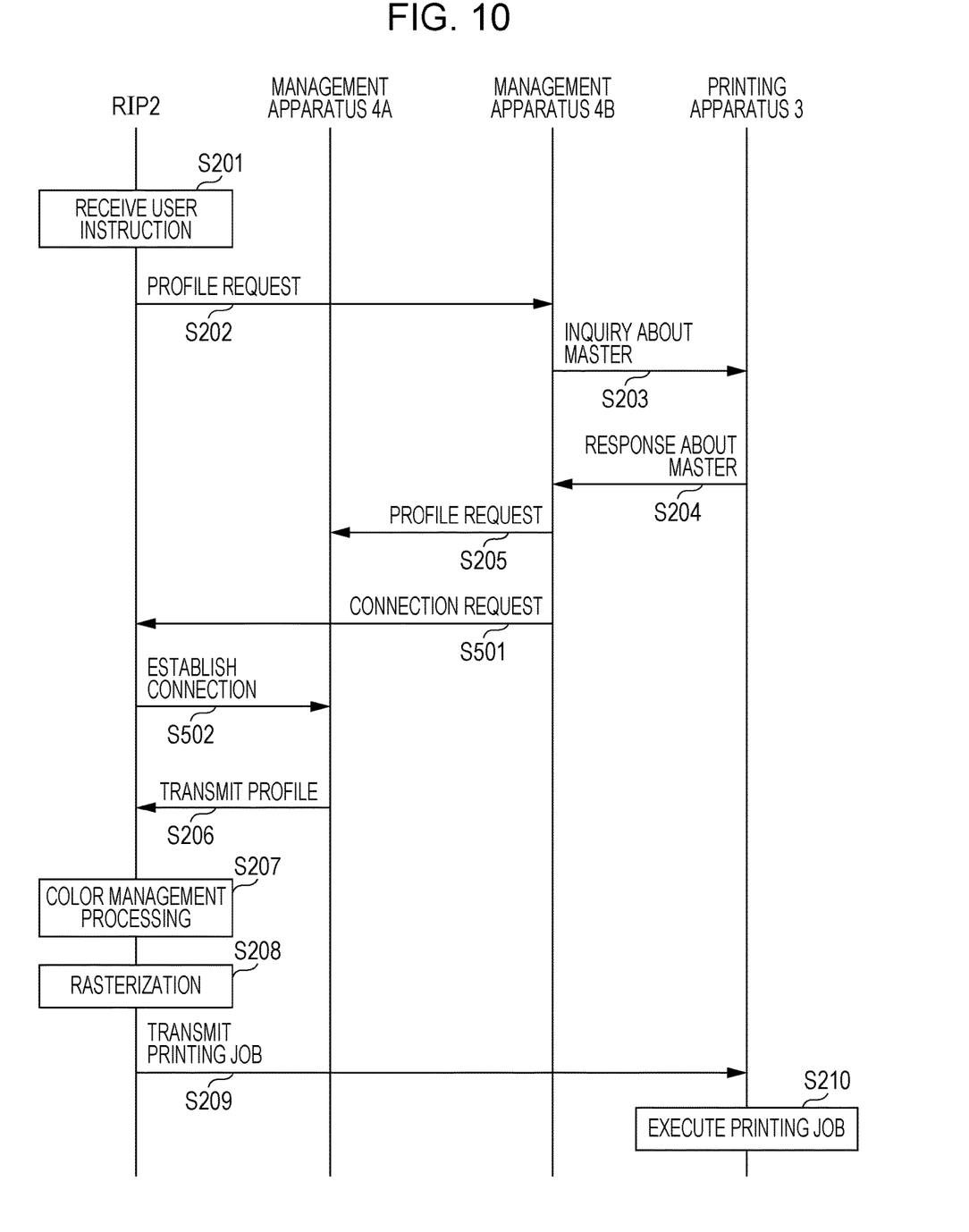
FIG. 10 is a flowchart illustrating the operation executed by the printing system in a fifth embodiment of the invention.

FIG. 10 is a flowchart illustrating an example of the operation executed by the printing system 1 in this fifth embodiment. The difference between this fifth embodiment and the first embodiment is that the connection between the RIP 2 and the second management apparatus 4A is secured. That is, the first management apparatus 4B transfers a profile request to the second management apparatus 4A in step S205, and simultaneously, makes a request to the RIP 2 for a connection to the second management apparatus 4A (step S501). Further, the RIP 2 having received the request for the connection establishes the connection to the second management apparatus 4A (step S502). These procedures enable the ICC profile P to be certainly transmitted to the RIP 2 from the second management apparatus 4A in step S206.

In the description of the above embodiments, the printing system 1 corresponds to an example of a "printing system" according to the invention; the RIP 2 corresponds to an example of an "image processing apparatus" according to the invention; the printing apparatus 3 corresponds to an example of "a printing apparatus" according to the invention; the management apparatuses 4 correspond to an example of "a plurality of management apparatuses" according to the invention; the second management apparatus 4A corresponds to an example of "a second management apparatus" according to the invention; each of the first management apparatuses 4B and 4C corresponds to an example of one of "at least one first management apparatus" according to the invention; the ICC profile P corresponds to an example of a color profile" according to the invention; and the piece of management information Ic corresponds to an example of "a piece of management information" according to the invention.

Others

It should be noted that the invention is not limited to the above embodiments, and various modifications can be made on the above description of the embodiments within a scope not departing from the gist of the invention. For example, in the above embodiments, the second management apparatus 4A having received a profile request from the first management apparatus 4B transmits an ICC profile P corresponding to the profile request to the RIP 2 directly, that is, not via the first management apparatus 4B. In this regard, however, as illustrated in FIG. 11, the second management apparatus 4A may transmit the ICC profile P corresponding to the profile request to the RIP 2 via the first management apparatus 4B.

Figure 11:
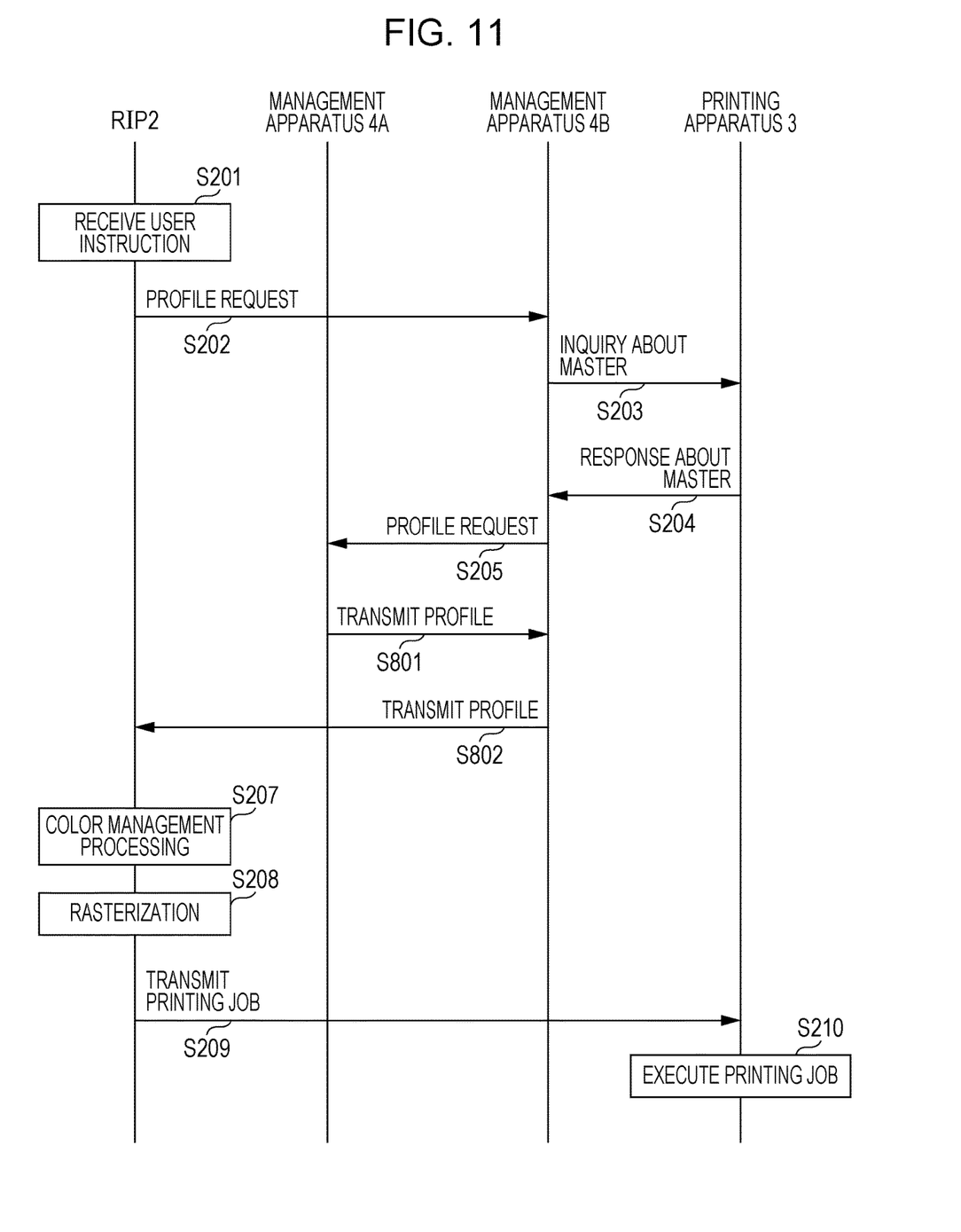
FIG. 11 is a flowchart illustrating a modification example of the operation executed by the printing system.

FIG. 11 is a flowchart illustrating a modification example of the operation executed by the printing system 1. The difference between the flowcharts illustrated in FIGS. 11 and 6 is that steps S801 and S802 are executed instead of step S206. That is, upon receipt of a profile request from the first management apparatus 4B in step S205, the second management apparatus 4A transmits an ICC profile P corresponding to the profile request to the first management apparatus 4B (step S801). Further, in step S802, the ICC profile P is transmitted to the RIP 2, not from the second management apparatus 4A, but from the first management apparatus 4B.

Moreover, a modification can be made on the above embodiments having been described with reference to the flowcharts illustrated in FIG. 6 and FIGS. 8 to 11. That is, in this modification example, the first management apparatus 4B stores and retains, in its storage means 42, an address identifying the second management apparatus 4A, and having been obtained from the printing apparatus 3 through the executions of steps S203 and S204. Further, upon receipt of a profile request thereafter (step S202), the first management apparatus 4B does not execute steps S203 and S204, but transmits the profile request to the second management apparatus 4A on the basis of the address stored in the storage means 42 (step S205). This configuration enables the first management apparatus 4B to, after the obtaining of the address of the second management apparatus 4A, transfer the request to the second management apparatus 4A without making the inquiry about the second management apparatus 4A to the printing apparatus 3.

Further, as described above, according to the flowchart of FIG. 5, there may occur a case where the second management apparatus 4A among the plurality of management apparatuses 4 is registered as the destination of the transmission of a profile request by the RIP 2. In this case, the second management apparatus 4A may be configured to, upon receipt of the profile request, send back, to the RIP 2, an ICC profile corresponding to the profile request.

By the way, the second management apparatus 4A stores therein the sets of setting information Im and the ICC profiles P, one of the sets of setting information Im and one of the ICC profiles being set to the printing apparatus 3 when a printing job j is executed, in such a way that, for each of the medium types Mk of the media M, a corresponding one of the sets of setting information Im and a corresponding one of the ICC profiles P are associated with each other. This configuration enables the second management apparatus 4A to collectively manage the sets of setting information Im for the printing apparatus 3 together with the ICC profiles P.

Further, the function of the second management apparatus 4A may be expanded utilizing such an advantage. That is, the second management apparatus 4A is also capable of transmitting, to the printing apparatus 3, a set of setting information Im associated with a medium type Mk of a printing medium M that is to be used as the execution target of a printing job J. This configuration enables the printing apparatus 3 to execute the printing job J using a suitable set of setting information Im associated with the medium type Mk of the printing medium M.

Further, a modification can be made on the above-described method for establishing the connection between the RIP 2 and the second management apparatus 4A, this method being illustrated in FIG. 10. In this modification example, the RIP 2 transmits, onto the network 5, an inquiry about the presence or absence of at least one management apparatus 4 by means of broadcasting, and then, establishes a connection to each of one or more management apparatuses 4 having sent back a reply within a constant period of time from the transmission of the inquiry. This configuration enables the RIP 2 to establish a connection to the second management apparatus 4A. Thus, upon receipt of the profile request in step S205, the second management apparatus 4A is capable of certainly transmitting the ICC profile P to the RIP 2 using the established connection.

Further, the total number for the management apparatuses 4 for managing the printing apparatus 3 is not limited "three" described above. Moreover, the total number for the RIP 2 included in the printing system 1 is not limited to "one" described above.

What is claimed is:

1. A printing system comprising:
   an image processing apparatus configured to execute color management processing on each of printing jobs using a color profile that is one of a plurality of color profiles each associated with a corresponding one of a plurality of mutually different types of printing media and that is associated with a printing medium included in the plurality of mutually different types of printing media and used as an execution target of the each printing job;
   a printing apparatus configured to perform printing of an image represented by the each printing job on the printing medium by executing the each printing job on which the color management processing has been executed; and
   a plurality of management apparatuses including at least one first management apparatus, and a second management apparatus configured to store in itself the plurality of color profiles, each of which is associated with a corresponding one of the plurality of mutually different types of printing media,
   wherein, when the image processing apparatus makes a request, to a first management apparatus among the at least one first management apparatus, for the color profile, which is associated with the printing medium used as the execution target of the each printing job, the first management apparatus, having received the request, transfers the request to the second management apparatus, and then, the second management apparatus transmits the color profile, which is specified based on the request, to the image processing apparatus,
   wherein the printing apparatus stores in itself a piece of management information indicating which one of the plurality of management apparatuses is the second management apparatus, and
   wherein, when the image processing apparatus makes the request to the first management apparatus, the first management apparatus, having received the request, specifies the second management apparatus based on the piece of management information, and transfers the request to the specified second management apparatus.

2. The printing system according to claim 1, wherein, upon receipt of the request, the first management apparatus stores in itself an address of the second management apparatus having been specified based on the piece of management information stored in the printing apparatus, and
   wherein, upon receipt of the request afterward, the first management apparatus transfers the request to the second management apparatus based on the stored address.

3. The printing system according to claim 1, wherein each of the at least one first management apparatus, including the first management apparatus, is capable of obtaining one or more color profiles among the plurality of color profiles.

4. The printing system according to claim 3, wherein, in a case where the first management apparatus already obtains the color profile specified by the request, the first management apparatus transmits the color profile to the image processing apparatus, and in a case where the first management apparatus does not obtain the color profile specified by the request, the first management apparatus transfers the request to the second management apparatus.

5. The printing system according to claim 3, wherein the each of the at least one first management apparatus transmits the obtained one or more color profiles to the second management apparatus.

6. The printing system according to claim 3, wherein the second management apparatus allows the plurality of color profiles, which is stored in in the second management apparatus itself, to be synchronized with the each of the at least one first management apparatus to allow the each of the at least one first management apparatus to obtain the plurality of color profiles.

7. The printing system according to claim 3, wherein, when, in response to the request, the second management apparatus transmits the color profile to the image processing apparatus, the second management apparatus transmits the color profile to the first management apparatus to allow the first management apparatus to obtain the color profile.

8. The printing system according to claim 1, wherein the second management apparatus transmits the color profile, which is specified based on the request, to the image processing apparatus via the first management apparatus.

9. The printing system according to claim 1, wherein the second management apparatus transmits the color profile, which is specified based on the request, to the image processing apparatus directly, that is, not via the first management apparatus.

10. The printing system according to claim 1, wherein the second management apparatus stores in itself a plurality of sets of setting information one of which is set to the printing apparatus when the each printing job is executed, in such a way that, for each of the plurality of mutually different types of printing media, a corresponding one of the plurality of sets of setting information is associated with a corresponding one of the plurality of color profiles.

11. The printing system according to claim 10, wherein the second management apparatus transmits, to the printing apparatus, a set of setting information that is one of the plurality of sets of setting information and that is associated with the printing medium, which is included in the plurality of mutually different types of printing media and used as the execution target of the each printing job.

12. The printing system according to claim 1, wherein, when the first management apparatus transfers the request to the second management apparatus, the first management apparatus requests the image processing apparatus to establish a connection to the second management apparatus.

13. A color profile management method comprising:
making a request, by an image processing apparatus, to a first management apparatus among at least one first management apparatus, for a color profile that is one of a plurality of color profiles each associated with a corresponding one of a plurality of mutually different types of printing media and that is associated with a printing medium included in the plurality of mutually different types of printing media and used as an execution target of each of printing jobs;
when the image processing apparatus makes the request to the first management apparatus, the first management apparatus, having received the request, specifies a second management apparatus based on a piece of management information indicating which one of the plurality of management apparatuses is the second management apparatus, the piece of management information being stored in a printing apparatus configured to perform printing of an image represented by the printing jobs;
transferring, by the first management apparatus, the request to the specified second management apparatus storing in itself the plurality of color profiles, each of which is associated with a corresponding one of the plurality of mutually different types of printing media, and
transmitting, by the specified second management apparatus, the color profile, which is specified based on the request, to the image processing apparatus.

14. A management apparatus comprising:
a control section configured to manage a printing apparatus for executing each of printing jobs, on which an image processing apparatus has executed color management processing using a color profile that is one of a plurality of color profiles each associated with a corresponding one of a plurality of mutually different types of printing media and that is associated with a printing medium included in the plurality of mutually different types of printing media and used as an execution target of the each printing job;
a storage section configured to store in itself the plurality of color profiles, each of which is associated with a corresponding one of the plurality of mutually different types of printing media; and
wherein, when a request for the color profile, which is associated with the printing medium used as the execution target of the each printing job, is transferred to the control section from an external apparatus having received the request from the image processing apparatus, the control section transmits the color profile, which is specified based on the request, to the image processing apparatus,
wherein the printing apparatus stores in itself a piece of management information indicating that the external apparatus should receive the color profile from the management apparatus, and
wherein, when the image processing apparatus makes the request to the external apparatus, the external apparatus, having received the request, specifies the management apparatus based on the piece of management information, and transfers the request to the management apparatus.

* * * * *